US005968106A

United States Patent [19]
DeVlieg et al.

[11] Patent Number: 5,968,106
[45] Date of Patent: Oct. 19, 1999

[54] AIRCRAFT STOP-TO-POSITION AUTOBRAKE CONTROL SYSTEM

[75] Inventors: Garrett H. DeVlieg, Bellevue; Robert F. Mackness, Marysville; David T. Yamamoto, Bothell, all of Wash.

[73] Assignee: The Boeing Company, Seattle, Wash.

[21] Appl. No.: 08/906,725

[22] Filed: Aug. 5, 1997

[51] Int. Cl.⁶ .................................................. G05D 1/06
[52] U.S. Cl. ........................ 701/70; 701/16; 244/183
[58] Field of Search ..................... 701/4, 14, 15, 701/16, 18, 70; 340/947, 958, 972; 244/183, 111; 303/126

[56] References Cited

U.S. PATENT DOCUMENTS

| | | | |
|---|---|---|---|
| 4,042,197 | 8/1977 | Boyle et al. | 244/183 |
| 4,316,252 | 2/1982 | Cooper | 244/183 |
| 4,367,529 | 1/1983 | Masclet et al. | 701/79 |
| 4,404,633 | 9/1983 | Goicoechea | 303/126 |
| 4,454,582 | 6/1984 | Cleary et al. | 701/15 |
| 4,580,744 | 4/1986 | Guichard | 244/111 |
| 4,638,437 | 1/1987 | Cleary et al. | 340/959 |
| 5,000,404 | 3/1991 | Martorella | 244/188 |
| 5,024,491 | 6/1991 | Pease, Jr. et al. | 303/195 |
| 5,047,942 | 9/1991 | Middleton et al. | 701/15 |
| 5,142,478 | 8/1992 | Crook | 701/16 |
| 5,539,642 | 7/1996 | Wiel | 701/70 |

Primary Examiner—Tan Nguyen
Attorney, Agent, or Firm—James P. Hamley

[57] ABSTRACT

An aircraft automatic braking system processes the flight crew selected stopping position of the aircraft on the runway via a control display unit (30) and the aircraft's actual position, provided by a global positioning system (34), to generate a stop-to-position deceleration control signal in a provided control logic (36). If the flight crew selects the stop-to-position autobraking mode, the system determines whether or not a stop-to-position autobraking mode meets several predetermined criteria and, if the criteria are met, applies a control signal to the aircraft's braking system (62, 66) such that the aircraft is smoothly braked tending it to stop at the selected runway stopping position. The system eliminates the need for pilot lookup in a manual to determine a desired autobraking setting to choose based on altitude, temperature, approach speed and runway conditions and also operates to reduce pilot workload during limited visibility conditions.

10 Claims, 4 Drawing Sheets

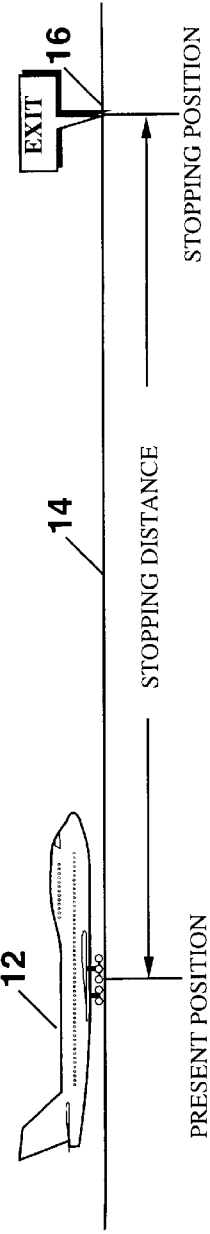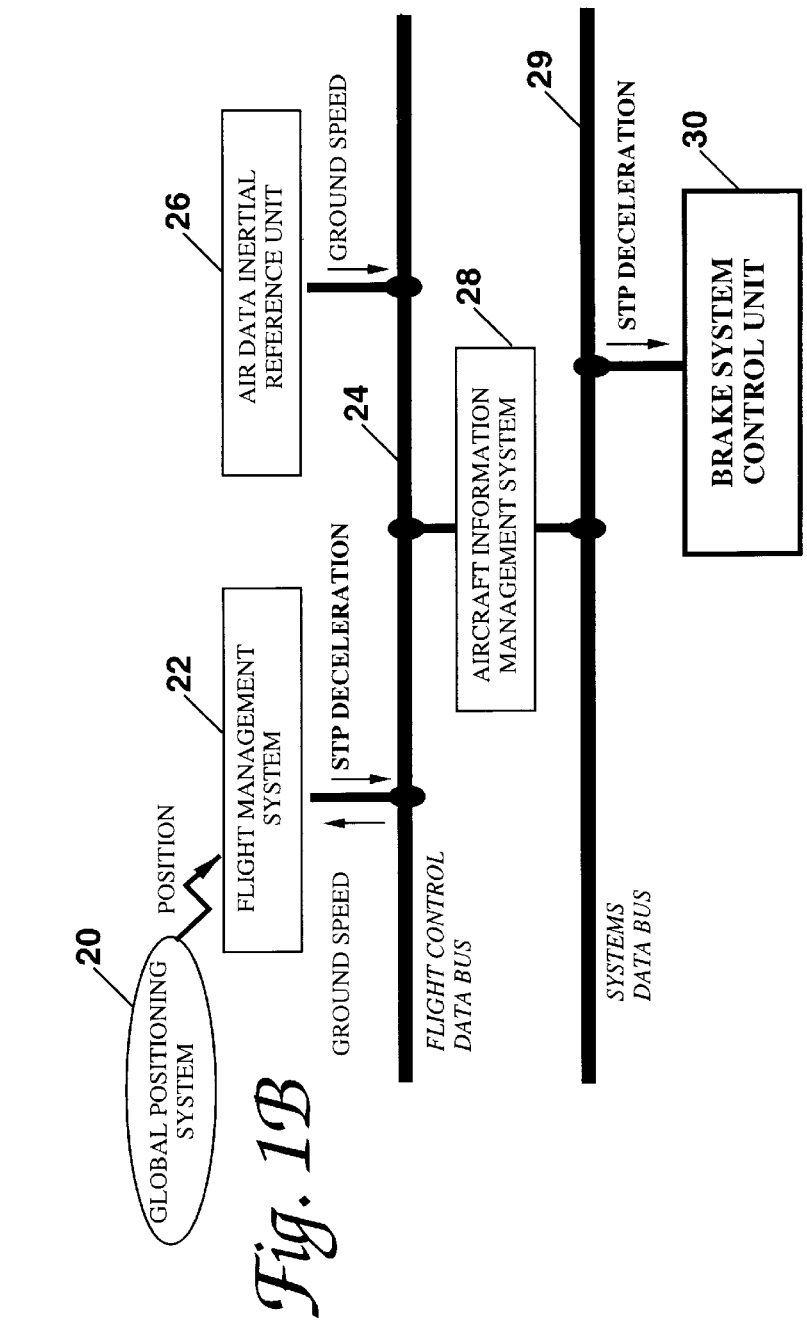

AIRCRAFT STOP-TO-POSITION AUTOBRAKE CONTROL SYSTEM

BACKGROUND OF THE INVENTION

The present invention relates to the aircraft braking art and, in particular, to an aircraft automatic braking system which applies predetermined braking to the aircraft such that the aircraft tends to stop at a selected point on the runway.

Prior to the present invention, aircraft autobrake systems controlled airplane deceleration to one of several aircraft deceleration settings. Thus, if a pilot wished to stop the airplane at a certain point on the runway, for example at a runway exit, it is unlikely that the autobrake system would provide a deceleration setting that matched the stopping distance to the selected runway stop point. The pilot's choice, then, was to select one of the deceleration settings, and, if the airplane was decelerating too quickly, disarm the autobrake system and use pedal braking to avoid stopping short of the desired point. If, however, the airplane was decelerating too slowly, the pilot would again need to revert to pedal braking to increase deceleration to stop the airplane at the selected stopping point. Both of the above conditions result in uneven deceleration that is apparent to the airplane passengers.

SUMMARY OF THE INVENTION

It is an object of this invention, therefore, to provide an aircraft stop-to-position autobrake control system.

It is a particular object of this invention to provide an aircraft automatic braking system which controls airplane braking to smoothly decelerate the airplane to a predetermined point on a runway without the requirement for the pilot to look into a flight manual to determine the appropriate autobrake setting to choose based on altitude, temperature, approach speed and runway conditions and, to reduce pilot workload during landings with limited visibility.

Briefly, according to the invention, an aircraft automatic braking system comprises a stop position input for selecting a desired aircraft stopping position on a runway. An aircraft positioning system is provided for determining the aircraft's present position. Control logic compares the aircraft's actual position with the selected stopping position and, in response thereto, predeterminedly decelerates the aircraft such that the aircraft tends to stop at the selected position.

A method for automatically stopping an aircraft at a selected position on a runway comprises the steps of:

(a) Providing an aircraft brake system which is responsive to input control signals to apply braking to the aircraft;

(b) Determining the aircraft's present position;

(c) Providing a stop position selector for selecting the desired aircraft stopping position on a runway; and (d) Providing logic control for comparing the aircraft's actual position with the selected stopping position and, responsive thereto, applying a predetermined control signal to the aircraft's brake system such that the aircraft brakes in a manner tending to stop the aircraft at the selected runway position.

BRIEF DESCRIPTION OF THE DRAWINGS

FIG. 1A depicts an aircraft on a runway which is positioned a predetermined stopping distance from the desired stopping position;

FIG. 1B is a block diagram illustrating the basic components of the present braking system and their interconnection for implementing the present stop-to-position automatic braking control system;

DESCRIPTION OF A PREFERRED EMBODIMENT

Figure 2:
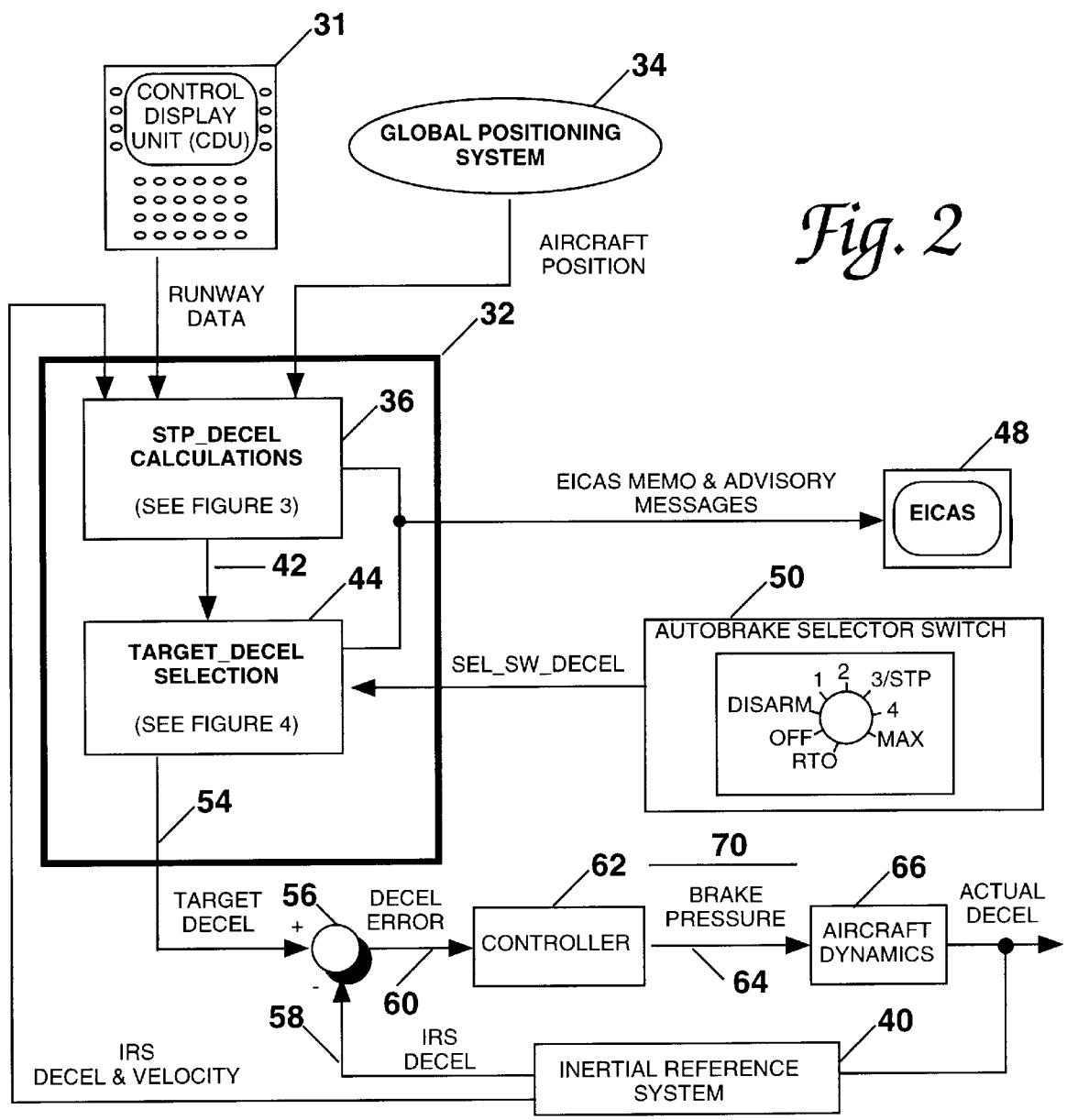
FIG. 2 is a more detailed block diagram of the various components, and their interconnection of the preferred embodiment of the stop-to-position automatic braking control system.

FIG. 1A illustrates in profile an aircraft 12 which is moving on a runway 14. The aircraft 12 is a predetermined stopping distance from a selected stopping position 16. The selected stopping position 16 may be, for example, a runway exit position from which the pilot should be able to see the desired exit and manually guide (taxi) the airplane off the runway to the airport terminal.

FIG. 1B is a block diagram illustrating the principal components, and their interconnection, of the preferred embodiment of the present stop-to-position automatic braking system. Here, the aircraft's current position is determined by a global positioning system 20. A signal representing aircraft position is routed from the global positioning system 20 to the flight management system 22. The flight management system 22 passes information to and from a flight control databus 24. The flight control databus 24 also connects to an air data inertial reference unit 26 which outputs to the databus information relating to the aircraft's ground speed.

Also connected to the flight control databus 24 is the aircraft information management system 28. The aircraft information management system 28 also connects to the system databus 29, which, in turn, connects to the aircraft brake system control unit 30.

The aircraft positioning system 20 provides a position signal reflecting the position of the aircraft 12 with respect to the desired stopping position 16. The flight management system 22 receives the aircraft's present position and ground speed as input over flight control databus 24 from the air data reference unit 26. The flight management system then generates a stop-to-position (STP) deceleration signal which it outputs to the flight control databus 24. Responsive to the STP deceleration signal, the aircraft information management system 28, assuming the flight crew has selected the stop-to-position deceleration mode, passes the STP deceleration signal over system databus 29 to the brake system control unit 32. In the known manner, the brake system control unit 30 responds to the STP deceleration control signal to automatically apply braking to the aircraft to create the desired aircraft deceleration. In this way, a predetermined braking is applied to the aircraft 12 such that it tends to stop at the selected stopping position 16.

The preferred embodiment of the present invention is the use of a closed-loop control of target deceleration to control the airplane's deceleration to stop at a precise location on the runway.

The stopping distance is obtained from a global positioning system. The average deceleration is then calculated to stop the airplane within this stopping distance. The formula used to calculate the average deceleration signal, STP_

DECEL, is derived from the basic equation of motion. It begins with the equation to calculate velocity.

$$v_{final} = v + at \tag{1}$$

where, $v_{final}$=final airplane velocity
v=the current airplane velocity
a=average airplane acceleration
t=time Position is determined by integrating equation (1).

$$x_{final} = x + vt + \frac{at^2}{2} \tag{2}$$

where, $x_{final}$=final airplane position
x=the current airplane position

The stopping distance, L, is the difference between the final and present position and is derived from equation (2), as shown below.

$$L = |x_{final} - x| = \left|vt + \frac{at^2}{2}\right| \tag{3}$$

Equation (1) can be rearranged to solve for time.

$$t = \frac{v_{final} - v}{a} \tag{4}$$

With equations (3) and (4) we have two equations and 2 unknowns (a and t). Substituting equation (4) into equation (3).

$$L = \left|v\left(\frac{v_{final} - v}{a}\right) + \frac{a\left(\frac{v_{final} - v}{a}\right)^2}{2}\right| \tag{5}$$

Simplifying, $$L = \left|\frac{v_{final}^2 - v^2}{2a}\right| \tag{6}$$

Solving for acceleration, a, in equation (6).

$$a = \pm\left|\frac{v_{final}^2 - v^2}{2L}\right| \tag{7}$$

The deceleration signal, STP_DECEL, is the magnitude of the acceleration calculated in equation (7).

$$STP\_DECEL = \left|\frac{v_{final}^2 - v^2}{2L}\right| \tag{8}$$

where, $L \geq L_{min} > 0$
$STP\_DECEL \geq STP\_DECEL_{min} > 0$

The range for STP_DECEL is restricted to positive values above zero to allow the autobrake system to ramp up brake pressure to maintain the airplane at its stopped position. Otherwise, when the present velocity equals the stopping velocity, STP_DECEL will equal zero and the autobrake system will not command brake pressure.

The range for the stopping distance, L, is restricted to prevent computational errors when L=0 (the case when the airplane is at its desired position). The minimum value for L, $L_{min}$, is based on the resolution of the computed position.

The STP_DECEL signal is transmitted to the normal autobrake control system, as shown on the attached figures. If the STP autobrake system is unavailable, the autobrake system will automatically switch over to the normal landing autobrake system and decelerate according to the setting selected on the autobrake selector switch.

A mode selection scheme is used to determine which target deceleration to use:

(1) The deceleration obtained from the autobrake selector switch, or (2) The STP_DECEL signal derived from equation (8).

The STP_DECEL signal is filtered to eliminate noise from the signal and to limit the rate at which the signal changes. The STP_DECEL signal is rate limited to ensure that the bandwidth of the autobrake system is adequate to control the time varying signal. The STP_DECEL signal is clamped to prevent excessive deceleration (normal landing autobrake is tested up to A/B MAX) and owing to the fact that the autobrake system can only retard the motion of the airplane (i.e. in the case if STP_DECEL is negative the autobrake system can not accelerate the airplane).

Once the TARGET_DECEL signal is determined, the autobrake system controls the airplane deceleration as normal. The same control algorithms are used.

FIG. 2 is a more detailed block diagram illustrating the preferred components, and their interconnection, to implement the preferred embodiment of the invention. Interface of the aircraft system to the flight crew is provided through a control display unit (CDU) 31. CDU 31 provides a control pad from which the flight crew enters runway data, such as the selected stopping position on the runway. In addition, the flight crew can enter data related to runway condition, such as wet, dry or frozen or special data related to the runway surface. The runway data from CDU 31 is applied as an input to the control logic 32. Also received as an input to the control logic 32 is the output from the aircraft's global positioning system 34. The global positioning system 34 produces an aircraft position signal representative of the present position of the aircraft on the runway.

Both the runway data from the CDU 31 and the aircraft position data from the global positioning system 34 are routed as inputs to the stop-to-position (STP) deceleration calculation box 36. Also provided as an input to stop-to-position deceleration calculation logic block 36 are signals from an inertial reference system 40 reflecting aircraft deceleration and velocity. In the manner described in detail with respect to the logic flow diagram of FIG. 3, the stop-to-position deceleration calculation logic block 36 produces a calculated STP decel signal which is passed over line 42 to the target deceleration selection logic block 44. Also, logic block 36 produces an engine indication crew alert system (EICAS) signal which is displayed to the flight crew on a provided EICAS display 48. Also coupled to the EICAS display 48 is the output from the target deceleration selection logic block 44. If the stop-to-position autobrake mode has been selected by the flight crew, an appropriate message is displayed on the EICAS display 48.

Also input to the target deceleration selection logic 44 is the output from an autobrake selector switch 50. The autobrake selector switch 50 is provided on the flight deck and allows the flight crew to select the desired braking mode of the aircraft. As shown, the switch includes the positions "off", meaning the autobrake system is turned off, "DISARM", which is used by the flight crew to temporarily disarm the autobraking system, and then positions "1", "2", "3/STP", "4" and "MAX". The positions "1", "2", "3", "4" and "MAX" all represent predetermined aircraft deceleration settings from a low decel setting of "1" to the highest autobraking decel setting of "MAX". Also, a position "RTO" is provided to apply full brake pressure if the flight crew initiates a refused takeoff.

If the flight crew desires to implement autobraking in accordance with the present invention, it selects the "3/STP" position of autobrake selector switch 50. Now, if the other conditions necessary for a stop-to-position automatic braking mode are in place, a stop-to-position autobraking function will be accomplished.

The target deceleration selection logic 44 processes the stop-to-position deceleration calculation from block 36 and the selected switch deceleration setting from the autobrake selector switch 50 to produce an output target deceleration signal on line 54. This target deceleration signal is compared in summing logic 56 with the inertial reference system (IRS) 40 provided deceleration signal over line 58. The difference between the target deceleration signal on line 54 and the IRS deceleration signal on line 58 represents a deceleration error signal which is output over line 60 to a controller 62. The controller 62 commands the level of brake pressure over line 64 which is applied to the aircraft's dynamics at block 66. Controller 62, line 64 and aircraft dynamics 66 comprise the primary components of the aircraft's braking system, indicated generally at 70. This, in turn, results in an actual deceleration that is measured by the inertial reference system 40. The IRS deceleration signal is transmitted to the autobrake system which then responds to brake the aircraft accordingly.

The actual deceleration signal produced out of the aircraft's dynamics 66 is provided as a feedback signal to the inertial reference system 40.

Figure 3:
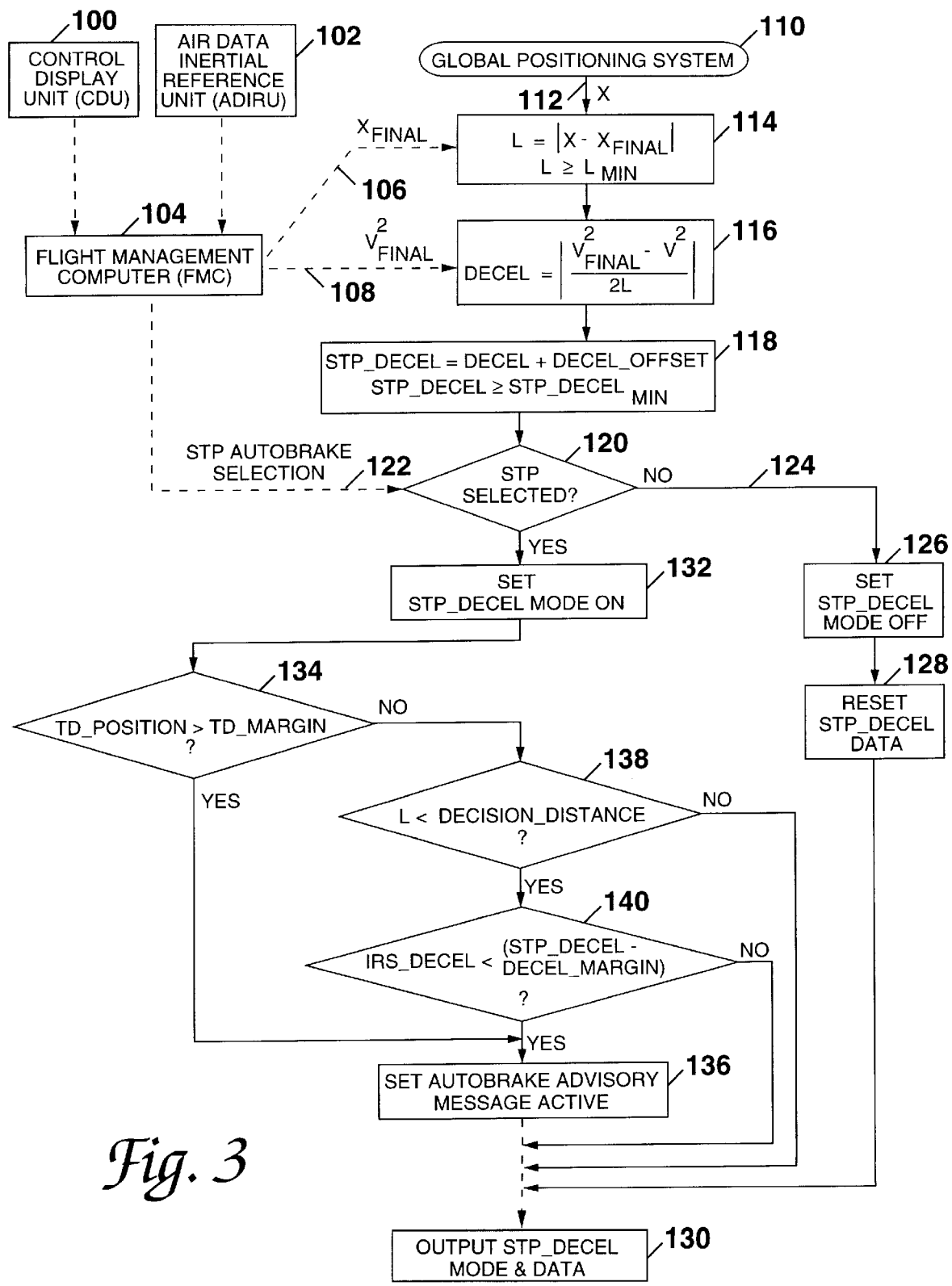
FIG. 3 is a logic flow diagram illustrating the sequential steps performed by the present automatic braking system to generate stop-to-position deceleration control signals.

FIG. 3 is a detailed logic flow diagram illustrating the sequential logical steps performed by the preferred embodiment of the present invention to create the stop-to-position deceleration control signals. Here, pilot input data over a provided control display unit 100 and inertial reference unit data over a provided air data inertial reference unit (ADIRU) 102 are fed to a flight management computer (FMC) 104. Among its other functions, the flight management computer 104 has stored in non-volatile memory applicable runway parameters for all desired airports.

Based on its input data and its stored data, flight management computer 104 outputs the selected aircraft stopping distance $X_{FINAL}$ over a line 106 and the desired aircraft velocity $V_{FINAL}^2$ over line 108.

A global positioning system 110, in the known manner, provides an output present aircraft position signal, X, over line 112 to a logic block 114. Logic block 114, in the manner shown, calculates the aircraft's stopping distance L and determines whether the stopping distance L is greater than a predetermined minimum value $L_{MIN}$. The output from logic block 114 is provided to logic block 116 which then calculates the deceleration value as shown.

The output from logic block 116 is passed to logic block 118 which calculates the aircraft's stop-to-position decel signal as equaling the deceleration value from block 116 plus a deceleration offset value. In addition, logic block 118 determines if the stop-to-position deceleration signal is greater than or equal to a required minimum stop-to-position deceleration value.

The output from logic block 118 is passed to a decision block 120. Decision block 120 also receives the stop-to-position autobrake selection signal over line 122 from the flight management computer 104. The decision block 120 determines whether or not the stop-to-position autobraking mode has been selected. If it has not, an appropriate output is applied over line 124 to logic block 126, which sets the stop-to-position deceleration off. Then, out of block 126, the stop-to-position deceleration data is reset at block 128 and the system increments to the output stop-to-position deceleration mode and data at block 130.

If, out of decision block 120, the STP mode has been selected, logic block 132 is entered and the stop-to-position deceleration mode is set "on". Out of logic block 132, the system enters a decision point 134 to determine whether or not the touchdown position is greater than a predetermined touchdown margin. If the predetermined touchdown position is outside of the touchdown margin, a block 136 is entered wherein the autobrake advisory message is set to active and the system then increments to the output stop-to-position deceleration mode and data block 130.

If, however, the touchdown position is not greater than the touchdown margin, a decision point 138 is entered. Here, a decision is made as to whether or not the stopping distance L is less than the decision distance. If the stopping distance L is not less than the decision distance, the system then increments again to block 130. If, however, the stopping distance is less than the decision distance, a decision block 140 is entered and the system determines whether or not the inertial reference system deceleration is less than the stop-to-position deceleration value minus the deceleration margin. If, out of decision block 140 is it determined that the IRS deceleration value is not less than the stop-to-position deceleration value minus the deceleration margin, the system again increments to block 130. However, if the IRS decision value is less than the stop-to-position deceleration value minus the deceleration margin, the system increments to block 136 to set the autobrake advisory message active and then increments to block 130 as before.

Figure 4:
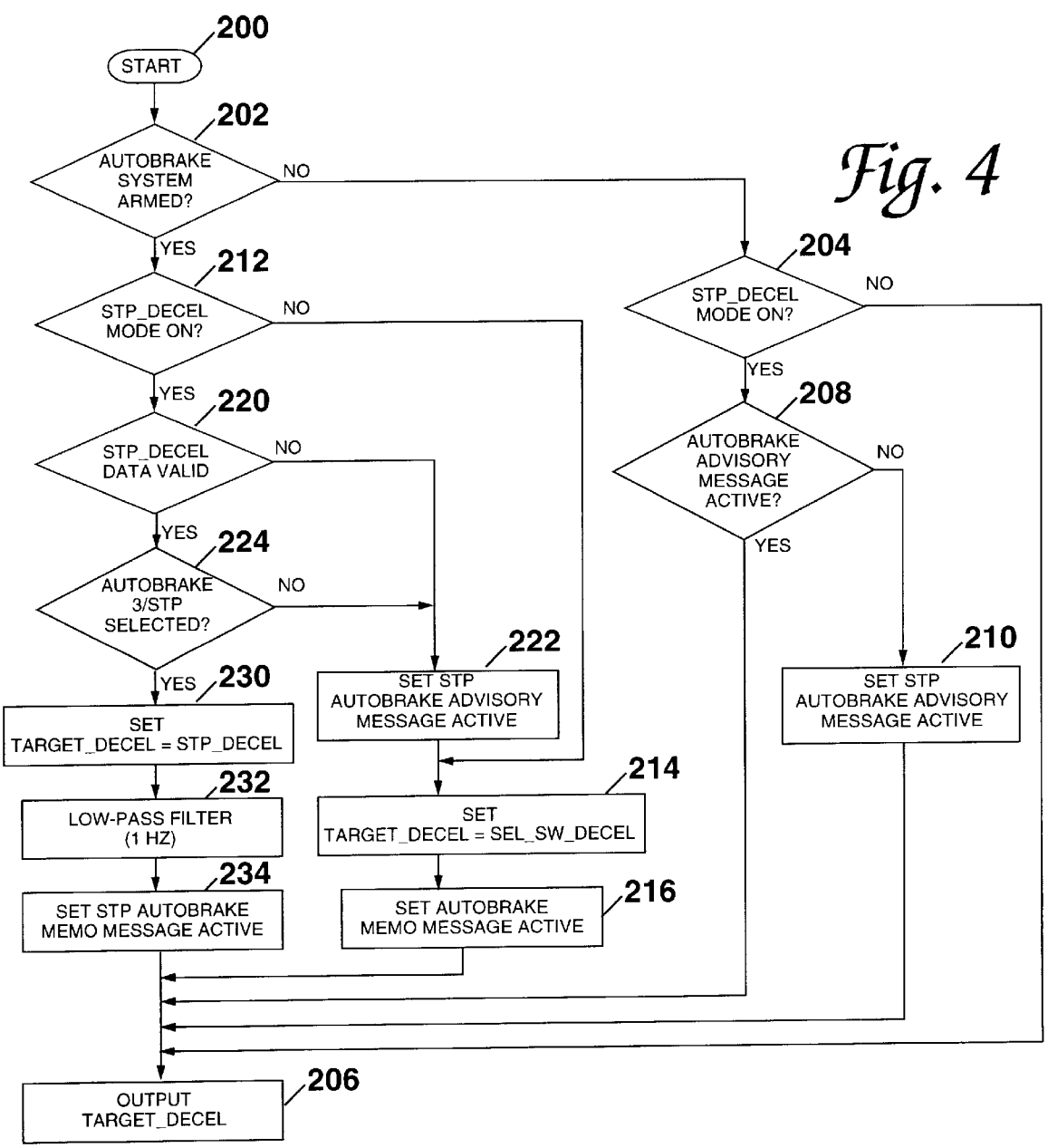
FIG. 4 is a logic flow diagram illustrating the sequential steps performed by the preferred system to implement target deceleration selection.

FIG. 4 is a logic flow diagram illustrating the sequential logical steps performed by the target selection logic 44 of FIG. 2.

Here, the system starts at position 200 and enters a decision block 202. In decision block 202 the system determines whether or not the autobrake system is armed. If the autobrake system is not armed, decision block 202 increments to a decision block 204. At decision block 204 the system determines whether or not the stop-to-position deceleration mode is on. If the stop-to-position deceleration mode is not on, the system increments to output the target deceleration signal at block 206. If the stop-to-position deceleration mode is on, the system increments to decision block 208 to determine whether or not the autobrake advisory message is active. If the autobrake advisory message is not active, the system increments to block 210 to set the stop-to-position autobrake advisory message to its active mode. It then increments to output the target deceleration in block 206.

If, out of block 208 the autobrake advisory message is active the system increments to decision block 206, to output the target deceleration.

Returning to decision block 202, if the autobrake system is on, a decision point 212 is entered. Here, it is determined whether or not the stop-to-position deceleration mode is on. If the stop-to-position deceleration mode is not on, the system increments to a block 214 to set the target deceleration equal to the selector switch deceleration. Out of block 214, the system increments to block 216 to set the autobrake memo message active and thereafter increment to output the target deceleration at block 206.

Returning to decision point 212, if the stop-to-position deceleration mode is on, the system increments to the decision point 220. At decision point 220, the stop-to-position deceleration data is analyzed to determine if it is valid. If the stop-to-position deceleration data is not valid, the system increments to block 222 to set the stop-to-position autobrake advisory message active. Then, out of block 222, block 214 is entered to set the target deceleration equal to the selected switch deceleration.

Returning to decision point 220, if the stop-to-position deceleration data is valid, decision point 224 is entered, and the system determines whether or not the autobrake "3/STP" position is selected. If the "3/STP" autobrake position has not been selected, the system again increments to block 222 to set the stop-to-position autobrake advisory message active. However, if, at decision point 224 the autobrake "3/STP" position is selected, the system enters block 230. At block 230, the system sets the target deceleration value equal to the stop-to-position deceleration value. Then, out of block 230, the target deceleration signal is low pass filtered at block 232 to limit the rate at which the deceleration control signal can change to ensure that the bandwidth of the aircraft brake system is adequate to process the filtered command and control signal. The filtered signal is then passed from block 232 to block 234 wherein the stop-to-position autobrake memo message is set to its active mode. Out of block 234, the output target deceleration value is provided via block 206.

A summary of the overall logic performed by the sequential steps set forth in FIGS. 3 and 4 is summarized as below.

TARGET DECELERATION LOGIC

The target deceleration level is computed as follows.
a. The TARGET_DECEL shall be set to the selector switch-based level (SEL_SW_DECEL) if any of the following conditions is met.
  1. STP_DECEL signal meets any of the following conditions.
    A. "OFF."
    B. "INVALID."
  2. Autobrake selector switch is not "3/STP."
b. The target deceleration shall be set to the stop-to-position level (STP_DECEL) if all of the following conditions are met.
  1. Landing autobrake system is armed.
  2. STP_DECEL signal meets all of the following conditions.
    A. "ON."
    B. "VALID."
  3. Autobrake selector switch is "3/STP."
c. After application, the TARGET_DECEL setting shall not revert to STP_DECEL once it has been set to SEL_SW_DECEL.

INDICATION LOGIC

The pilot is alerted that STP autobrake is selected when the STP AUTOBRAKE memo message appears on the Engine Indication and Crew Alert System (EICAS) display. The STP autobrake system also provides a signal to the FMC indicating that STP AUTOBRAKE is selected. The STP AUTOBRAKE MEMO message shall be transmitted when all of the following conditions are met.
a. Landing autobrake system is armed.
b. STP_DECEL mode is "ON."
c. STP_DECEL data is "VALID."
d. Autobrake 3/STP is selected.

The pilot is alerted that STP autobrake is inoperative when the STP AUTOBRAKE ADVISORY message appears on the EICAS display. The STP AUTOBRAKE ADVISORY message shall be transmitted when all of the following conditions are met.
a. The AUTOBRAKE ADVISORY is "INACTIVE."
b. Any of the following conditions are met.
  1. Landing autobrake system is armed and any of the following conditions is met.
    A. STP_DECEL data is "INVALID."
    B. Autobrake 3/STP is not selected.
  2. STP_DECEL mode is "ON" and any of the following conditions is met.
    A. STP AUTOBRAKE MEMO message is "INACTIVE."
    B. IRS_DECEL<(STP_DECEL−DECEL_MARGIN) when the stopping distance, L, is less than DECISION_DISTANCE.
    C. TD_POSITION is >TD_MARGIN. (This provision prevents use of bad data in the event the airplane lands or touchdown on a different runway without re-selection of STP autobrake, for example in the case of an aborted landing).

DECEL_MARGIN: An extra increment of deceleration which is added to the STP_DECEL level that ensures the airplane stops short of the desired exit despite some inaccuracy in the STP_DECEL level.

DECISION_DISTANCE: The distance from the desired exit at which the decision must be made as to whether the maximum STP_DECEL level is capable of stopping the airplane within the remaining distance from the exit.

TD_MARGIN: The margin allowed for an airplane to land within the initial estimated touchdown point on the runway.

A DECEL_OFFSET is added to the calculated DECEL level to ensure the airplane can be stopped before the exit position.

In summary, a stop-to-position aircraft automatic braking system has been described in detail. Whereas a preferred embodiment of the invention has been described, it should be apparent that many modifications and variations thereto are possible, all of which fall within the true spirit and scope of the invention.

What is claimed is:

1. An aircraft automatic braking system comprising:
  (a) stop position input means for selecting a desired aircraft stopping position on a runway;
  (b) an aircraft positioning system for determining the aircraft's present position; and
  (c) control means for continuously comparing the aircraft's actual position with said selected stopping position and, in response thereto, predeterminedly decelerating said aircraft such that the aircraft tends to stop at said selected position.

2. An aircraft automatic braking system for automatically stopping the aircraft at a selected position on the runway, the system comprising:
  (a) an aircraft brake system which is responsive to input control signals to apply braking to the aircraft;
  (b) an aircraft positioning system for determining the aircraft's present position;
  (c) a stop position selection means for selecting the desired aircraft stopping position on a runway; and
  (d) logic control means for continuously comparing the aircraft's actual position with the selected stopping position and, in response thereto, applying a predetermined control signal to said aircraft's brake system such that the aircraft brakes in a manner tending to stop the aircraft at said selected runway position.

3. The system of claim 2 wherein said logic control means further includes filtering means for limiting the rate at which said control signal changes to ensure that the bandwidth of said aircraft brake system is adequate to process the filtered control signal.

4. The system of claim 2 wherein said logic control means further includes control signal clamping means to prevent excessive aircraft braking.

5. The system of claim 3 wherein said logic control means further includes control signal clamping means to prevent excessive aircraft braking.

6. A method for aircraft automatic braking comprising the steps of:

(a) providing for the input of a selected aircraft stopping position on a runway;

(b) determining the aircraft's present position; and (c) continuously comparing the aircraft's present position with the selected stopping position and, responsive thereto, predeterminedly decelerating said aircraft such that the aircraft tends to stop at said selected position.

7. A method for automatically stopping an aircraft at a selected position on a runway, the method comprising the steps of:

(a) providing an aircraft brake system which is responsive to input control signals to apply braking to the aircraft;

(b) determining the aircraft's present position;

(c) providing a stop position selector for selecting the desired aircraft stopping position on a runway; and (d) providing logic control means for continuously comparing the aircraft's actual position with the selected stopping position and, responsive thereto, applying a predetermined control signal to the aircraft's brake system such that the aircraft brakes in a manner tending to stop the aircraft at the selected runway position.

8. The method of claim 7 wherein the logic control means further performs the step of filtering the control signal to limit the rate at which the control signal changes to ensure that the bandwidth of the aircraft brake system is adequate to process the filtered control signal.

9. The method of claim 7 wherein the logic control means performs the further step of clamping the control signal to thereby prevent excessive aircraft braking.

10. The method of claim 8 wherein the logic control means performs the further step of clamping the control signal to thereby prevent excessive aircraft braking.

* * * * *